US009674710B2

(12) United States Patent
Chen et al.

(10) Patent No.: US 9,674,710 B2
(45) Date of Patent: Jun. 6, 2017

(54) CHANNEL DEPENDENT COVERAGE ENHANCEMENT TECHNIQUES IN LTE

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/574,143

(22) Filed: Dec. 17, 2014

(65) Prior Publication Data

US 2015/0181440 A1 Jun. 25, 2015

Related U.S. Application Data

(60) Provisional application No. 61/919,531, filed on Dec. 20, 2013.

(51) Int. Cl.

| | |
|---|---|
| H04L 1/00 | (2006.01) |
| H04W 16/18 | (2009.01) |
| H04W 72/04 | (2009.01) |
| H04W 72/08 | (2009.01) |
| H04L 5/02 | (2006.01) |
| H04W 16/26 | (2009.01) |
| H04W 48/08 | (2009.01) |
| H04L 1/08 | (2006.01) |

(52) U.S. Cl.
CPC ............... *H04W 16/18* (2013.01); *H04L 1/08* (2013.01); *H04L 5/02* (2013.01); *H04W 16/26* (2013.01); *H04W 48/08* (2013.01); *H04W 72/0446* (2013.01); *H04W 72/085* (2013.01); *H04W 72/046* (2013.01)

(58) Field of Classification Search
CPC . H04W 72/04; H04W 72/048; H04W 72/042; H04W 72/121
USPC .......................... 370/310, 328, 329, 338, 343
See application file for complete search history.

(56) References Cited

U.S. PATENT DOCUMENTS

2013/0315218 A1 11/2013 Cheong et al.
2015/0043420 A1* 2/2015 Xiong ................ H04B 7/15507
370/315

OTHER PUBLICATIONS

Ericsson et al., "Required Functionality for Coverage Enhancements for MTC," 3GPP TSG-RAN WG1 Meeting #71, New Orleans, US, Nov. 12-16, 2012, 2 pgs., R1-124888, 3rd Generation Partnership Project.
(Continued)

*Primary Examiner* — Dady Chery
(74) *Attorney, Agent, or Firm* — Holland & Hart LLP

(57) ABSTRACT

Methods, systems, and devices are described for coverage enhancement in a wireless communication system. A base station may select different coverage enhancement techniques for different channels, and transmit the channels using the selected coverage enhancement techniques. Examples of coverage enhancement techniques that may be selected include repetition within subframes, repetition across different subframes, power boosting, and spatial multiplexing. These and other techniques may be used alone or in combination. In some examples, a user equipment (UE) may determine a coverage enhancement need and may monitor a control channel accordingly.

28 Claims, 13 Drawing Sheets

(56) References Cited

OTHER PUBLICATIONS

ISA/EPO, International Search Report and Written Opinion of the International Searching Authority, Int'l Appl. No. PCT/US2014/071226, Jun. 11, 2015, European Patent Office, Rijswijk, NL, 15 pgs.

Huawei et al., "Coverage Enhancement for Physical Channels and Signals for Low-Cost MTC," 3GPP TSG RAN WG1 Meeting #72, St Julian's, Malta, Jan. 28-Feb. 1, 2013, R1-130017, URL: http://www.3gpp.org/ftp/tsg_ran/WG1_RL1/TSGR1_72/Docs/, 3rd Generation Partnership Project.

ISA/EPO, Partial International Search Report of the International Searching Authority, Int'l App. No. PCT/US2014/071226, Mar. 16, 2015, European Patent Office, Rijswijk, NL, 5 pgs.

LG Electronics, "Text Proposal on Coverage Enhancement for a MTC UE," 3GPP TSG RAN WG1 #72, St Julian's, Malta, Jan. 28-Feb. 1, 2013, R1-130264, URL: http://www.3gpp.org/ftp/tsg_ran/WG1_RL1/TSGR1_72/Docs/, 3rd Generation Partnership Project.

\* cited by examiner

CHANNEL DEPENDENT COVERAGE ENHANCEMENT TECHNIQUES IN LTE

CROSS REFERENCES

The present Application for patent claims priority to U.S. Provisional Patent Application No. 61/919,531 by Chen et al., entitled "Channel Dependent Coverage Enhancement Techniques in LTE," filed Dec. 20, 2013, assigned to the assignee hereof, and expressly incorporated by reference herein.

BACKGROUND

The following relates generally to wireless communication, and more specifically to selecting coverage enhancement techniques. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

SUMMARY

Methods, systems, and devices are described for coverage enhancement in a wireless communication system. A base station may select different coverage enhancement techniques for different channels, and transmit the channels using the selected coverage enhancement techniques. Examples of coverage enhancement techniques that may be selected include repetition within subframes, repetition across different subframes, power boosting, and spatial multiplexing. These and other techniques may be used alone or in combination. For example, a repetition technique may be selected for a broadcast control channel, and a spatial multiplexing technique may be selected for a unicast data channel. In some cases, similar techniques may be selected for the different channels. For example, a repetition technique utilizing repetition within subframes may be selected for one channel and a repetition technique without repetition within subframes, or utilizing a different number of repetitions may be selected for another channel.

In some embodiments, a method of coverage enhancement in a wireless communication system includes selecting a first coverage enhancement technique for a first channel from a set of coverage enhancement techniques including at least one of repetition over different subframes or power boosting, selecting a second coverage enhancement technique, different from the first coverage enhancement technique, for a second channel from the set of coverage enhancement techniques, transmitting a first portion of data on the first channel using the first coverage enhancement technique, and transmitting a second portion of data on the second channel using the second coverage enhancement technique.

In some embodiments, an apparatus for coverage enhancement in a wireless communication system includes means for selecting a first coverage enhancement technique for a first channel from a set of coverage enhancement techniques including at least one of repetition over different subframes or power boosting, means for selecting a second coverage enhancement technique, different from the first coverage enhancement technique, for a second channel from the set of coverage enhancement techniques, means for transmitting a first portion of data on the first channel using the first coverage enhancement technique, and means for transmitting a second portion of data on the second channel using the second coverage enhancement technique.

In some embodiments, a non-transitory computer-readable medium storing code for wireless communications includes instructions executable to select a first coverage enhancement technique for a first channel from a set of coverage enhancement techniques including at least one of repetition over different subframes or power boosting, select a second coverage enhancement technique, different from the first coverage enhancement technique, for a second channel from the set of coverage enhancement techniques, transmit a first portion of data on the first channel using the first coverage enhancement technique, and transmit a second portion of data on the second channel using the second coverage enhancement technique.

In some embodiments, an apparatus for coverage enhancement in a wireless communication system includes a processor, memory in electronic communication with the processor, and instructions stored in the memory. The instructions may be executable by the processor to select a first coverage enhancement technique for a first channel from a set of coverage enhancement techniques including at least one of repetition over different subframes or power boosting, select a second coverage enhancement technique, different from the first coverage enhancement technique, for a second channel from the set of coverage enhancement techniques, transmit a first portion of data on the first channel using the first coverage enhancement technique, and transmit a second portion of data on the second channel using the second coverage enhancement technique.

In certain examples of the method, apparatuses, or computer readable medium, the set of coverage enhancement techniques may further include precoding for spatial multiplexing.

In certain examples of the method, apparatuses, or computer readable medium, the first channel may include a broadcast or a groupcast channel and the first coverage enhancement technique may include repetition over different subframes.

In certain examples of the method, apparatuses, or computer readable medium, the second channel may include a unicast channel and the second coverage enhancement technique may include precoding for spatial multiplexing.

In certain examples of the method, apparatuses, or computer readable medium, the second channel may include a physical downlink shared channel (PDSCH).

In certain examples of the method, apparatuses, or computer readable medium, the set of coverage enhancement techniques may further include a repetition within a subframe.

In certain examples of the method, apparatuses, or computer readable medium, the first channel may include a physical downlink control channel (PDCCH) and the second coverage enhancement technique include the repetition within the subframe.

In certain examples of the method, apparatuses, or computer readable medium, the repetition within the subframe may include use of a maximum aggregation level larger than 8.

In certain examples of the method, apparatuses, or computer readable medium, the maximum aggregation level may be dependent on a downlink system bandwidth.

In certain examples of the method, apparatuses, or computer readable medium, the first channel may include an enhanced physical downlink control channel (EPDCCH) and the second coverage enhancement technique may include the repetition within the subframe.

In certain examples of the method, apparatuses, or computer readable medium, the repetition within the subframe may include use of a maximum aggregation level larger than a nominal level without coverage enhancement.

In certain examples of the method, apparatus, or computer readable medium, a number of physical resource blocks (PRBs) configured for EPDCCH may be larger than 8.

In certain examples, the method, apparatuses, or computer readable medium may also include steps for, means for, or instructions executable by a processor for selecting a third coverage enhancement technique for the second channel from the set of coverage enhancement techniques, and transmitting a third portion of data on the second channel using the third coverage enhancement technique.

In certain examples of the method, apparatuses, or computer readable medium, the first coverage enhancement technique may include a first number of repetitions over a first plurality of subframes, the third coverage enhancement technique may include a second number of repetitions over a second plurality of subframes, and the second number of repetitions may be strictly less than the first number of repetitions.

In some embodiments, a method of coverage enhancement in a wireless communication system may include determining a coverage enhancement need for a UE, and monitoring a control channel based at least in part on the determined coverage enhancement need.

In some embodiments, an apparatus for coverage enhancement in a wireless communication system includes a processor, memory in electronic communication with the processor, and instructions stored in the memory. The instructions may be executable by the processor to determine a coverage enhancement need for a UE, and monitor a control channel based at least in part on the determined coverage enhancement need.

In some embodiments, an apparatus for coverage enhancement in a wireless communication system includes a means for determining a coverage enhancement need for a UE, and a means monitoring a control channel based at least in part on the determined coverage enhancement need.

In some embodiments, a non-transitory computer-readable medium storing code for wireless communications includes instructions executable to determine a coverage enhancement need for a UE, and monitor a control channel based at least in part on the determined coverage enhancement need.

In certain examples of the method, apparatuses, or computer readable medium, determining the coverage enhancement need includes identifying an aggregation level, and monitoring a control channel includes monitoring the identified aggregation level. Identifying the aggregation level may include identifying a different aggregation level than used for a prior coverage enhancement.

In certain examples of the method, apparatuses, or computer readable medium, the control channel includes at least one of a physical downlink control channel (PDCCH) or an enhanced PDCCH (EPDCCH). In some examples, determining the coverage enhancement need includes determining a size of bundled transmission for a control channel. In some examples, determining the coverage enhancement need includes determining that no coverage enhancement is needed for a control channel.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
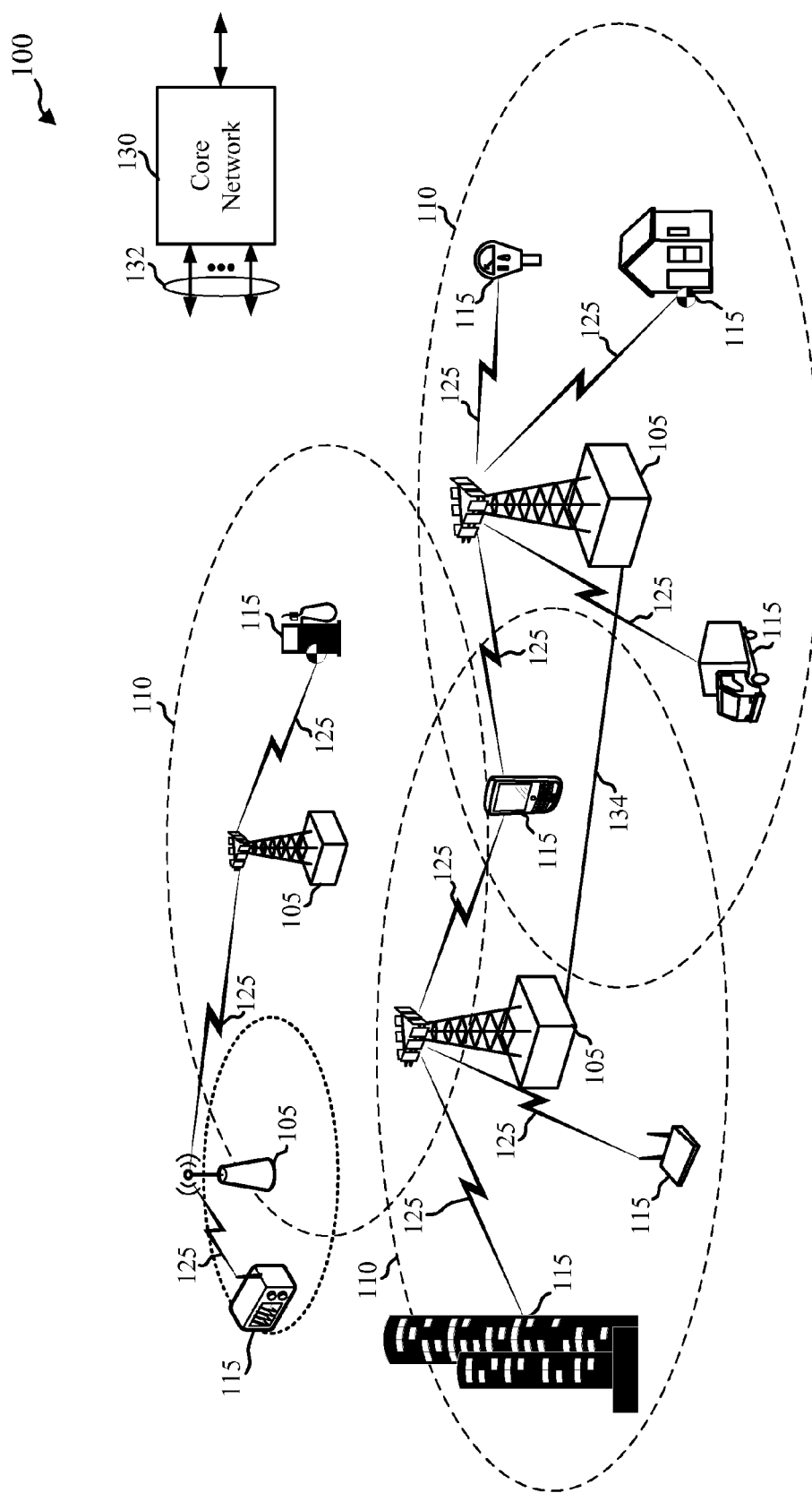
FIG. 1 shows a block diagram of an example wireless communications system in accordance with various embodiments of the disclosure.

Some types of wireless devices may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Coverage enhancement techniques may be implemented that enable MTC and other wireless communication devices to transmit and receive data from a wireless system at greater range and at lower power levels. Different coverage enhancement techniques may result in different coverage trade-offs. For example, repetition of data over multiple subframes may improve range, and/or reception reliability, but it may also decrease the potential data rate. Boosting transmission power may also increase range and/or reliability, but it may increase energy use and interference with other transmissions. Wireless devices may receive and transmit multiple channels for which the value of the tradeoffs may be different. For example, a control channel may have different reliability considerations than a user data channel. Also, a broadcast channel may be directed to more than one wireless device, whereas a unicast channel may be directed toward a single device.

Methods, systems, and devices are described for coverage enhancement in a wireless communication system. A base station may select different coverage enhancement techniques for different channels, and transmit or receive on the channels using the selected coverage enhancement techniques. Examples of coverage enhancement techniques that may be selected include repetition within subframes, repetition across different subframes, power boosting, beamforming, and spatial multiplexing. These and other techniques may be used alone or in combination. For example, a repetition technique may be selected for a broadcast control channel, and a spatial multiplexing technique may be selected for a unicast data channel. In some cases, similar techniques may be selected for the different channels. For example, a repetition technique utilizing repetition within subframes may be selected for one channel and a repetition technique without repetition within subframes, or utilizing a different number of repetitions may be selected for another channel.

By selecting different coverage techniques for different channels, a base station may make more appropriate tradeoffs for different data channels. For example, a control channel may be broadcast with a high repetition level and/or a high transmission power to ensure reliable reception by a number of mobile devices at different locations within a cell. The control channel may not include a large amount of data, so this technique may not interfere significantly with other transmissions and it may not have a significant impact on the total amount of data that can be transferred. At the same time, a base station may transmit a large amount of data to one or more individual mobile devices using spatial multiplexing, which may include using a beamforming array antenna to transmit more energy in a particular direction.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 and UMB are described in documents from an organization named "3rd Generation Partnership Project 2" (3GPP2). CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS).

3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The communication links 125 may be organized according to different channels for different types of data, which may be transmitted and received using different physical resources in the time and frequency dimensions. Different transmission considerations may apply to different types of information and/or channels. For example, data rate may be a priority for some channels and reliability may be a priority for other channels.

The base stations 105 may wirelessly communicate with the devices 115 via one or more base station antennas. Each of the base stations 105 may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The communication devices 115 are dispersed throughout the wireless communications system 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A communication device 115 may be an MTC device, cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in the wireless communications system 100 may include uplink (UL) transmissions from a communication device 115 to a base station 105, and/or downlink (DL) transmissions, from a base station 105 to a communication device 115. The downlink transmissions may also be called forward link transmissions while the uplink transmissions may also be called reverse link transmissions.

In embodiments, the wireless communications system 100 is an LTE/LTE-A network. In LTE/LTE-A networks, the terms evolved Node B (eNB) and user equipment (UE) may be generally used to describe the base stations 105 and communication devices 115, respectively. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

Multiple eNBs 105 may be configured to collaboratively communicate with multiple UEs 115 through, for example, Coordinated Multi-Point (CoMP), or other schemes. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115. The eNBs 105 and/or UEs 115 may have multiple antennas and may use multiple-input multiple-output (MIMO) techniques to take advantage of multipath environments to transmit multiple data streams.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The system 100 may be configured to employ coverage enhancement techniques to, for example, increase the size of a coverage area 110, or provide better service to UEs 115 within an existing coverage area 110. An eNB 105 may select different coverage enhancement techniques for different channels, and transmit on the channels using the selected coverage enhancement techniques. Examples of coverage enhancement techniques that may be selected include repetition within subframes, repetition across different subframes, power boosting, and spatial multiplexing. Enhanced spatial multiplexing techniques may involve three-dimensional spatial multiplexing by directing energy according to azimuth and altitude. For example, a transmission may be directed at a user on a certain floor of a high-rise building. An eNB 105 may select different coverage enhancement techniques for different UEs sharing transmission resources of a particular channel.

For MTC devices in LTE-A, coverage enhancement techniques may be used to enhance coverage by up to 15 dB over earlier technologies. In some cases, channels are repeatedly transmitted over multiple subframes in an effort to meet coverage enhancement requirements. For instance, various physical channels—including physical broadcast channel (PBCH), physical random access channel (PRACH) and associated messages, physical uplink shared channel (PUSCH), physical uplink control channel (PUCCH), physical downlink control channel (PDCCH), enhanced PDCCH (EPDCCH), and physical downlink shared channel (PDSCH)—may be repeatedly transmitted from a UE 115 or eNB 105. The number of repetitions can be on the order of tens of subframes; and different channels may have different repetition levels. Such coverage enhancements may be indicated as a UE capability and may be extended to other types of UEs 115 (e.g., non-MTC UEs).

In some cases, wireless technologies may support up to 8 transmit antennas at a base station, deployed in one dimension only. This may allow for spatial multiplexing or single user multiple-input, multiple output (SU-MIMO) in the horizontal direction. Additionally or alternatively, higher order MIMO, beamforming based on more than 8 transmit antennas, and/or two-dimensional systems designed to enhance peak data rate and/or beamforming operation may be supported. Inclusion of antennas in a third dimension (e.g., in elevation) may allow beamforming also in the vertical plane, e.g. to support different floors in a high rise building. For instance, in a two dimensional antenna array system with 64 antennas, a grid of 8 by 8 antennas on a two dimensional plane may be deployed. Horizontal beamforming as well as vertical beamforming may be used to exploit beamforming and/or spatial multiplexing gain both in azimuth and elevation. In some cases, improved beamforming gain may be achieved with a larger number of antennas, which may help improve cell coverage. For example, as compared with transmit diversity, beamforming gain may be more than 10 dB.

Figure 2:
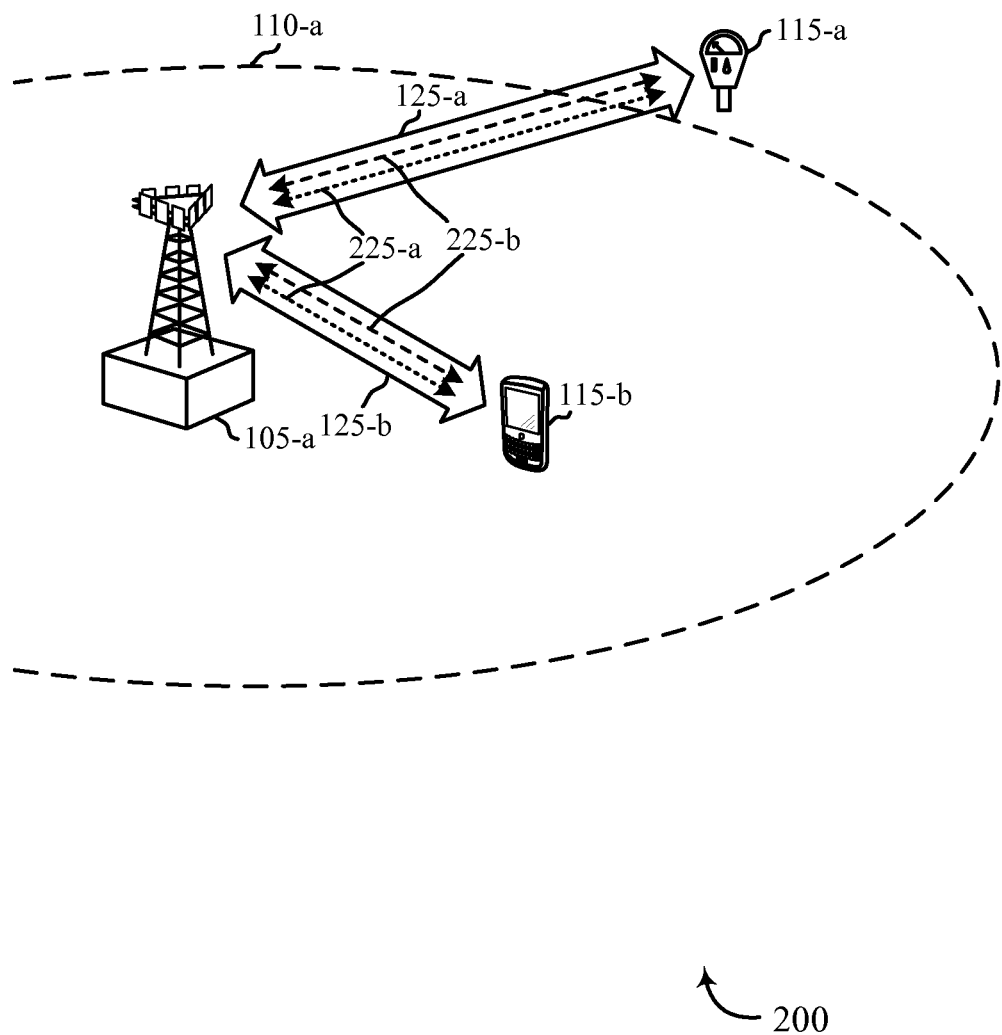
FIG. 2 shows a block diagram of an example wireless communications system in accordance with various embodiments of the disclosure.

Turning next to FIG. 2, a diagram shows a wireless communications system 200 in accordance with various embodiments. Wireless communications system 200 may be an example of part of a wireless communications system 100 described with reference to FIG. 1. System 200 includes an eNB 105-a, with coverage area 110-a, and a UE 115-a. The components of system 200 may be examples of the corresponding components of system 100.

The eNB 105-a may communicate with UEs 115-a and 115-b via transmission links 125-a and 125-b, respectively. Transmission links 125-a and 125-b may be established using carriers organized into physical channels 225-a and 225-b. Channel 225-a may be used to transmit and/or receive a different type of information than channel 225-b. The channels may both be used for DL transmissions, they may both be used for UL transmissions, or one could be an UL channel and the other could be a DL channel.

Downlink physical channels 225 may include a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). In some cases, the channels may be modified or enhanced. For example, the system 200 may utilize an enhanced physical downlink control channel (EPDCCH) that offers more flexibility in the use of resources compared to a conventional PDCCH.

The PDCCH and EPDCCH carry information regarding the downlink scheduling assignments, uplink resource grants, transmission scheme, uplink power control, hybrid automatic return repeat request (HARM) information, modulation and coding schemes (MCS) and other information in messages known as downlink control information (DCI). The size of a DCI message can depend on the DCI format and the transmission bandwidth. The aggregation level specifies a number of logically or physically contiguous control channel elements (CCEs) utilized to convey a single DCI payload. An aggregation level L may utilize L CCEs for a PDCCH or enhanced control channel elements (ECCE) for an EPDCCH. A user equipment attempts to decode the DCI by performing a process known as a blind decode, during which a plurality of decode attempts are carried out according to the search space until the DCI is detected. The search space can be partitioned into two regions: a common search space and a UE-specific (dedicated) search space. The common search space is monitored by all UEs served by an eNB and can include information such as paging information, system information, random access procedures and the like. The UE-specific search space includes user-specific control information and is configured individually for each UE. To reduce the computations performed at the UEs, each search space may include a number of DCI candidates at predefined locations and aggregation levels.

In LTE/LTE-A, the common search space can include two possible aggregation levels, level-4 (e.g., 4 CCEs) and level-8 (e.g., 8 CCEs). The UE-specific search space based on PDCCH can be configured to include four aggregation levels: 1, 2, 4 or 8, corresponding to 1, 2, 4 and 8 CCEs, respectively.

Uplink physical channels 225 may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In some embodiments, channel 225-a may carry control signaling (e.g., DCI, etc.) associated with data transmissions over channel 225-b. For example, channel 225-a may be a PDCCH and channel 225-b may be a PDSCH. In this regard, communication of information to a particular UE 115 may involve transmissions over each of channels 225-a and 225-b utilizing different coverage enhancement techniques. Channels 225-a and 225-b may be transmitted simultaneously or they may be transmitted in different time periods. In some cases, channel 225-a may have different transmission priorities than channel 225-b. For example, channel 225-a may prioritize reliable reception and channel 225-b may prioritize data rate. Channels 225-a and 225-b may be broadcast, groupcast or unicast channels.

In one embodiment, channel 225-a and channel 225-b are DL channels and eNB 105-a may select different coverage enhancement techniques for transmission of the channels to ensure optimal communications with UE 115-a. For example, eNB 105-a may transmit channel 225-a using a repetition technique, and channel 225-b using a power boosting technique. As another example, eNB 105-a may transmit channel 225-a using a repetition technique, and 225-b using spatial multiplexing. If channel 225-a is a broadcast control channel, using a repetition technique may facilitate reliable transmission to a number of UEs 115 including UE 115-a and UE 115-b. If channel 225-b is a unicast data channel, spatial multiplexing may facilitate a higher data rate by transmitting multiple parallel data streams to UE 115-a, while beamforming may be used to transmit more energy in the direction of UE 115-b.

In some cases, different coverage enhancement techniques may be used for transmissions on the same channel, but they may be used for different purposes (e.g., broadcast vs. unicast). For example, repetition may be used for broadcast or groupcast transmissions on PDSCH, while beamforming may be used for unicast transmissions on PDSCH. In some cases, the eNB 105-a may select different coverage enhancement techniques for different UEs sharing transmission resources of a particular channel. For example, eNB 105-a may utilize spatial multiplexing for PDSCH transmissions to UEs subject to a multipath environment (e.g., UE 115-a, etc.), while utilizing beamforming for PDSCH transmissions to UEs at the cell edge (e.g., UE 115-b, etc.)

In some cases, a non-MTC UE 115 may exhibit like an MTC UE 115 capable of coverage enhancements in a massive MIMO cell (e.g., a macro cell with multiple transmit and receive antennas that are optionally distributed within the cell, etc.). Such a UE 115 may initially access the system using repetition-based coverage enhancements, and also indicate that it is capable of beamforming operation. The eNB may perform unicast with the UE using PDCCH of an aggregation level greater than 8 and perform a beamformed unicast PDSCH, or EPDCCH/PDSCH, both with a beamforming operation.

In some embodiments, coverage enhancement techniques for a channel may be signaled to the UE explicitly or implicitly. For example, a selected coverage enhancement technique may depend on search space for an assignment. In one example, a unicast PDSCH may utilize a repetition-based coverage enhancement technique when scheduled by DCI in a common search space, while unicast PDSCH may have beamforming-based coverage enhancement when scheduled by DCI in UE-specific search space. In another example, unicast PDSCH may utilize repetition with a first repetition level (L1) when scheduled by DCI in common search space, while unicast PDSCH may have beamforming and a second, lower repetition level (L2, where L2<L1) when scheduled by DCI in UE-specific search space.

In one embodiment, for an eNB 105 with a large coverage area 110, a large number of receive antennas at eNB 105 may help balance a coverage mismatch between DL and UL. In some cases, receiver beamforming is possible at an eNB 105 for reception of UL transmissions from a UE 115. Depending on the circumstances, receiver beamforming may allow reduced repetition for PUCCH and/or PUSCH. For example, repetition level for PUCCH and/or PUSCH may be reduced as compared with DL channels (e.g., broadcast PDSCH, etc.).

In some cases, high quality channel feedback may be used to enable beamforming operation. In some cases, due to the focus on coverage enhancement, however, high rank transmissions may not be utilized (e.g., rank may be less than or equal to 2). In other cases, subband channel quality information (CQI) or a precoding matrix indicator (PMI) may not be utilized. In such cases, wideband PMI and wideband CQI may be sufficient. This may serve to reduce UL overhead, and thus provide better UL coverage. In some cases, separate channel state information (CSI) feedback for control and data may be supported.

Figure 3:
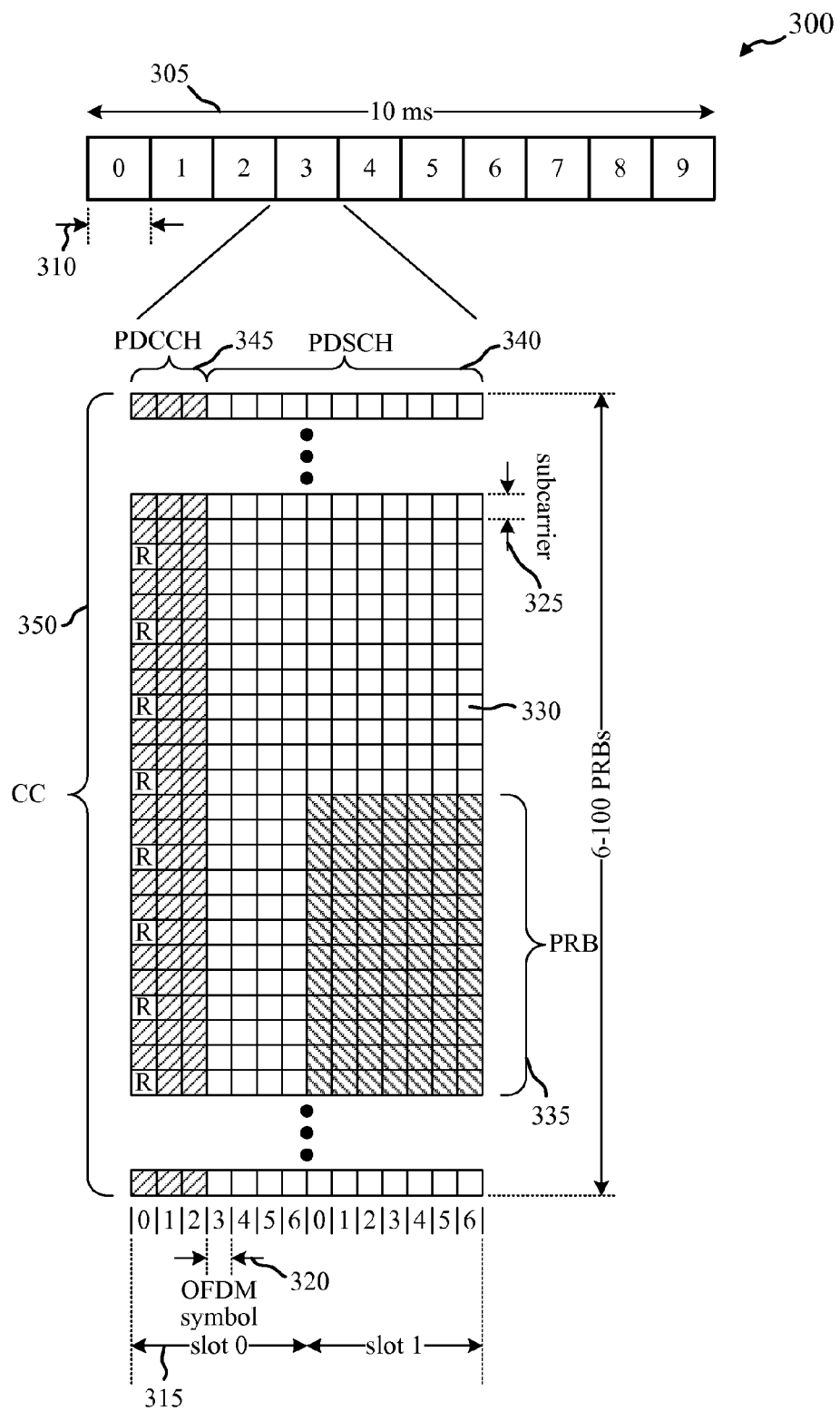
FIG. 3 shows a frame structure of resources for a component carrier that may be used in a coverage enhancement technique, including repetition, in accordance with various embodiments.

Turning next to FIG. 3, a diagram illustrates a frame structure 300 of resources for a component carrier that may be used in a coverage enhancement technique, including repetition, in accordance with various embodiments. The frame structure 300 may be used in a wireless communication system, such as systems 100 and 200 described with reference to FIGS. 1 and 2. Time resources for a carrier 350 may be divided into 10 millisecond (ms) periods called frames 305. A frame 305 may be further divided into ten (10) 1 ms subframes 310. A subframe 310 may be further divided into two 0.5 ms slots 315, and each slot 315 may be divided into a number of symbol periods 320. For example, a slot 315 may be divided into 7 symbol periods 320.

Frequency resources may be divided into subcarriers 325. The spacing between adjacent subcarriers 325 may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

One frequency subcarrier 325 by one symbol period 320 make a single resource element 330, which may be modulated with a single modulation symbol. Modulation symbols may be waveforms containing a number of bits of data depending on a modulation and coding scheme (MCS). A physical resource block (PRB) 335 includes twelve subcarriers for one slot, or seven symbol periods. Thus, each PRB 335 may include 84 resource elements. In some cases, the PRB 335 may be the basic unit for allocating resources with different configurations. A PRB 335 may include symbols from multiple transmission channels, which may be separated on the carrier by time and/or frequency. For example, it may include both symbols for the transmission of a control channel 345 and symbols for a data channel 340.

In some cases, a number of control channel elements (CCE), not shown, may be used for sending information from one or more control channels. A single CCE may include a set of 36 resource elements 330, which in some cases may be transmitted on multiple subcarriers 325 at the beginning of a frame. The number of CCEs used for sending control channel information may be referred to as the aggregation level. The maximum aggregation level may depend on the system bandwidth. That is, it may depend on the number of subcarriers 325 available for transmission.

Figure 4A:
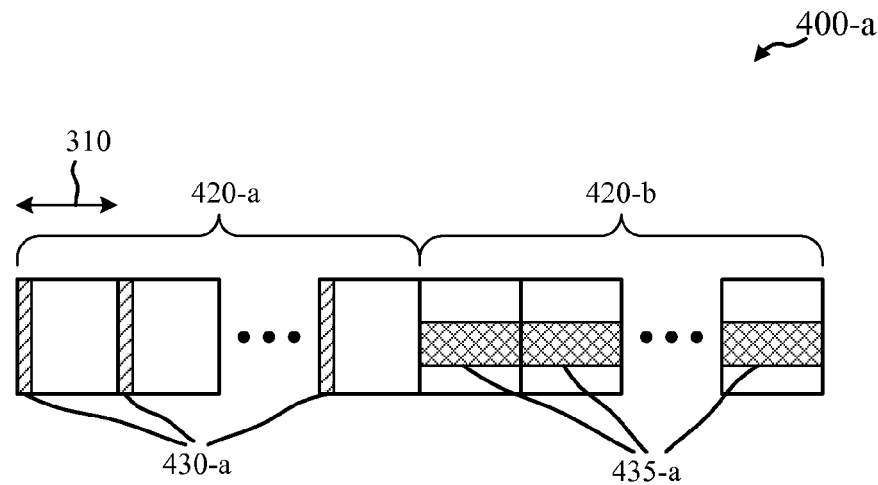
FIG. 4A shows a timing diagram illustrating inter-subframe repetition across subframe sets and FIG. 4B shows a an example of repetition of DCI within the PDCCH and a codeword within the PDSCH of a subframe.

A coverage enhancement technique including repetition may involve repetition of modulation symbols within a subframe (intra-subframe repetition) or across subframes (inter-subframe repetition). FIG. 4A shows a timing diagram 400-a illustrating inter-subframe repetition across subframe sets 420. For example, DCI 430-a may be repeated across subframe set 420-a, which may include repetition of DCI 430-a in each subframe 310 of the subframe set 420-a. DCI 430-a may provide an assignment of resources for transmission of a codeword 435-a, which may be repeated across subframe set 420-b. Subframe set 420-a may include M subframes 310, while subframe set 420-b includes N subframes, where M may be the same as N, less than N, or greater than N. Subframe set 420-b may overlap partially or completely with subframe set 420-a, in some cases. Subframe sets 420 for repetition of control signaling or data signaling may include consecutive subframes, or non-consecutive subframes, in some cases.

For intra-subframe repetition, one or more modulation symbols are repeated on time-frequency resources (e.g., resource elements, control channel elements (CCEs), PRBs, etc.) within a subframe. The one or more modulation symbols may be repeated in contiguous time-frequency resources or they may be repeated in non-contiguous time-frequency resources throughout the subframe.

Several repetitions of a modulation symbol may be referred to as a bundle. As used here, the term bundling size, bundling length, or size of a bundled transmission may refer to the number of repetitions of a modulation symbol. Additionally or alternatively, bundling size, bundling length, or size of a bundled transmission may refer to the number of consecutive transmission time intervals (TTI) with a repeated modulation symbol, repeated signal, repeated signal, or the like.

Figure 4B:
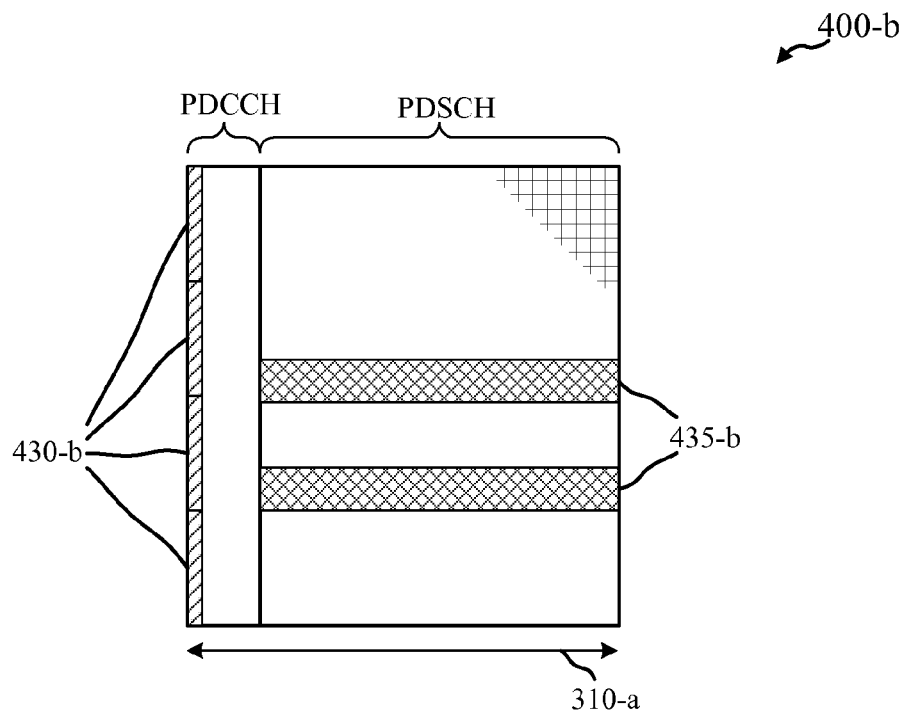

FIG. 4B shows a diagram 400-b illustrating an example of repetition of DCI 430-b within the PDCCH and codeword 435-b within the PDSCH of subframe 310-a. In one embodiment, repetition of DCI within a subframe may include monitoring a maximum aggregation level larger than a nominal level without coverage enhancement. In some cases, this may include monitoring a maximum aggregation level equal to or larger than 16. For example, instead of a maximum aggregation level of 8 for PDCCH, a wireless system may support aggregation level 32, or 64 for PDCCH in a subframe. In some embodiments, repetition of DCI may include restrictions on sets of aggregation levels. For example, MTC UEs 115 using coverage enhancement may monitor DCI in the user specific search space using only aggregation levels 4 and 8 while UEs 115 without a coverage enhancement requirement may use existing aggregation levels (e.g., 1, 2, 4 or 8). In some embodiments, UEs 115 utilizing coverage enhancement may monitor an extended set of aggregation levels by including at least one higher aggregation level. For example, MTC UEs 115 may monitor PDCCH candidates of aggregation levels 8, 16, and 32.

Determining which aggregation level to monitor may be a function of a coverage enhancement need, which may change. For example, a UE 115 may, in some cases, require no coverage enhancements, but in other scenarios, the UE 115 may have a coverage enhancement need of 5 dB or 20 dB, for example. Thus, a UE 115 may determine a coverage enhancement need, and it may monitor a control channel based on the determined need. That is, the UE 115 may identify an aggregation level associated with a coverage enhancement need and the UE 115 may monitor the aggregation level accordingly. Because a UE's 115 coverage enhancement needs may change or vary, the UE 115 may identify and monitor an aggregation level that is different from an aggregation level used for prior coverage enhancements. The UE 115 may monitor either the DCI 430-b or the codeword 435-b, or both, in various examples. The UE 115 may thus monitor either PDCCH, EPDDCH, or both.

In some cases, one or more modulation symbols may be repeated both within a subframe and across different subframes. In embodiments, a larger aggregation level for DCI may be used to reduce the number of PDCCH repetitions over subframes. For example, where coverage enhancement is provided by repetition of DCI twelve times, the DCI may be repeated four times within each subframe in which DCI is transmitted using a higher aggregation level, while the DCI with higher aggregation level is repeated over three subframes.

The maximum number of available CCEs in a cell may depend on system bandwidth. For example, a 1.4 MHz system, the maximum number of available CCEs may be less than 8. For a 20 MHz system, the max number of available CCEs may be larger than 80. Similarly, the maximum number of available ECCEs in a cell may depend on the number of resource blocks configured. For example, if only 2 PRBs are configured, up to 8 ECCEs may be available. If 8 PRBs are configured, up to 32 ECCEs may be available.

In some cases, aggregation levels for UEs 115 utilizing coverage enhancement may be bandwidth dependent. For example, for 10 MHz and higher, there may be support for levels 8, 16 and 32 decoding candidates. For less than 10 MHz, there may be support for levels 4, 8, and 16. The number of repetitions over different subframes for PDCCH/EPDCCH can also be subframe dependent. In some cases, the number of available CCEs may not be divisible by 4 or 8, and additional aggregation levels may be supported. For instance, for 1.4 MHz, if only 7 CCEs are available, there may be support for a level 7 decoding candidate.

Power boosting may be supported in addition to larger aggregation levels for coverage enhancement. The set of supporting aggregation levels and/or the number of repetitions over different subframes for PDCCH/EPDCCH may be implicitly derived based on system bandwidth, or explicitly indicated, e.g., indicated in system information such as SIB1.

Various coverage enhancement techniques may be selected and applied to various downlink physical channels. In some cases, one coverage enhancement technique may be selected and applied to one physical channel, and a second, different coverage enhancement technique may be selected and applied to a different physical channel. For instance, a repetition technique over different subframes may be applied to the PBCH, while repetition within a subframe may be applied to the PDCCH. Or, in some cases, enhanced beamforming for unicast PDSCH or EPDCCH may be used and power boosting (or a combination of techniques) may be applied to another channel. In some examples, a different coverage enhancement technique may be selected and applied to the EPDCCH based on a transmission type. For example, one coverage enhancement technique may be selected and applied to a distributed EPDCCH transmission mode, and a second, different coverage enhancement technique may be selected and applied to a localized EPDCCH transmission mode. In some examples, a different coverage enhancement technique may be selected and applied to the EPDCCH based on a resource set when two or more resource sets are configured for a UE. For example, one coverage enhancement technique may be selected and applied to a first EPDCCH resource set, and a second, different coverage enhancement technique may be selected and applied to a second EPDCCH resource set.

One or more of the channels described above may utilize repetition over multiple subframes to meet coverage enhancement priorities. Examples of channels that utilize repetition may include PBCH, PRACH, RACH message 2, PUSCH, PUCCH, PDCCH, EPDCCH, PDSCH.

Figure 5:
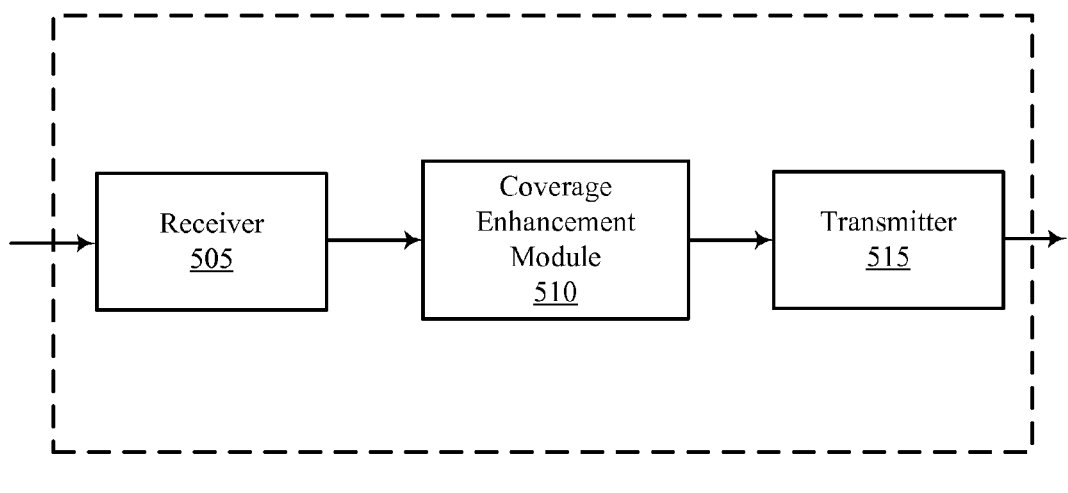
FIG. 5 shows a block diagram of an example device configured for coverage enhancement in accordance with various embodiments of the disclosure.

Turning next to FIG. 5, a block diagram shows a device 500 for coverage enhancement in a wireless communication system in accordance with various embodiments. The device 500 may be an example of one or more aspects of an eNB 105 or a UE 115 described with reference to FIGS. 1 and 2. The device 500 may include a receiver 505, a coverage enhancement module 510, and/or a transmitter 515. The device 500 may also include a processor (not shown). Each of these components may be in communication with each other.

The receiver 505 may receive information such as packets, user data, and/or control information associated with various information channels. System information may be passed on to the coverage enhancement module 510, and to other components of the device 500.

The coverage enhancement module 510 may be means for selecting a first coverage enhancement technique for a first channel from a set of coverage enhancement techniques including at least one of repetition over different subframes or power boosting. It may also be means for selecting a second coverage enhancement technique, different from the first coverage enhancement technique, for a second channel from the set of coverage enhancement techniques. In one embodiment, the coverage enhancement module 510 may also be means for selecting a third coverage enhancement technique for the second channel from the set of coverage enhancement techniques. Information and instructions may be passed from the coverage enhancement module 510 to a processor (not shown), the receiver 505, the transmitter 515, or other components of the device 500.

In some examples, the coverage enhancement module 510 is a means for determining a coverage enhancement need for a UE and for monitoring a control channel based on the determined coverage enhancement need. The device 500 may thus adapt to various or changing coverage enhancement needs.

The transmitter 515 may transmit the one or more signals received from other components of the device 500. In some embodiments, the transmitter 515 may be collocated with the receiver in a transceiver module. The transmitter 515 may include a single antenna, or it may include a plurality of antennas. The transmitter 515 may be means for transmitting a first portion of data on the first channel using the first coverage enhancement technique. It may also be means for transmitting a second portion of data on the second channel using the second coverage enhancement technique. In one embodiment, the transmitter 515 may also be means for transmitting a third portion of data on the second channel using the third coverage enhancement technique.

Figure 6A:
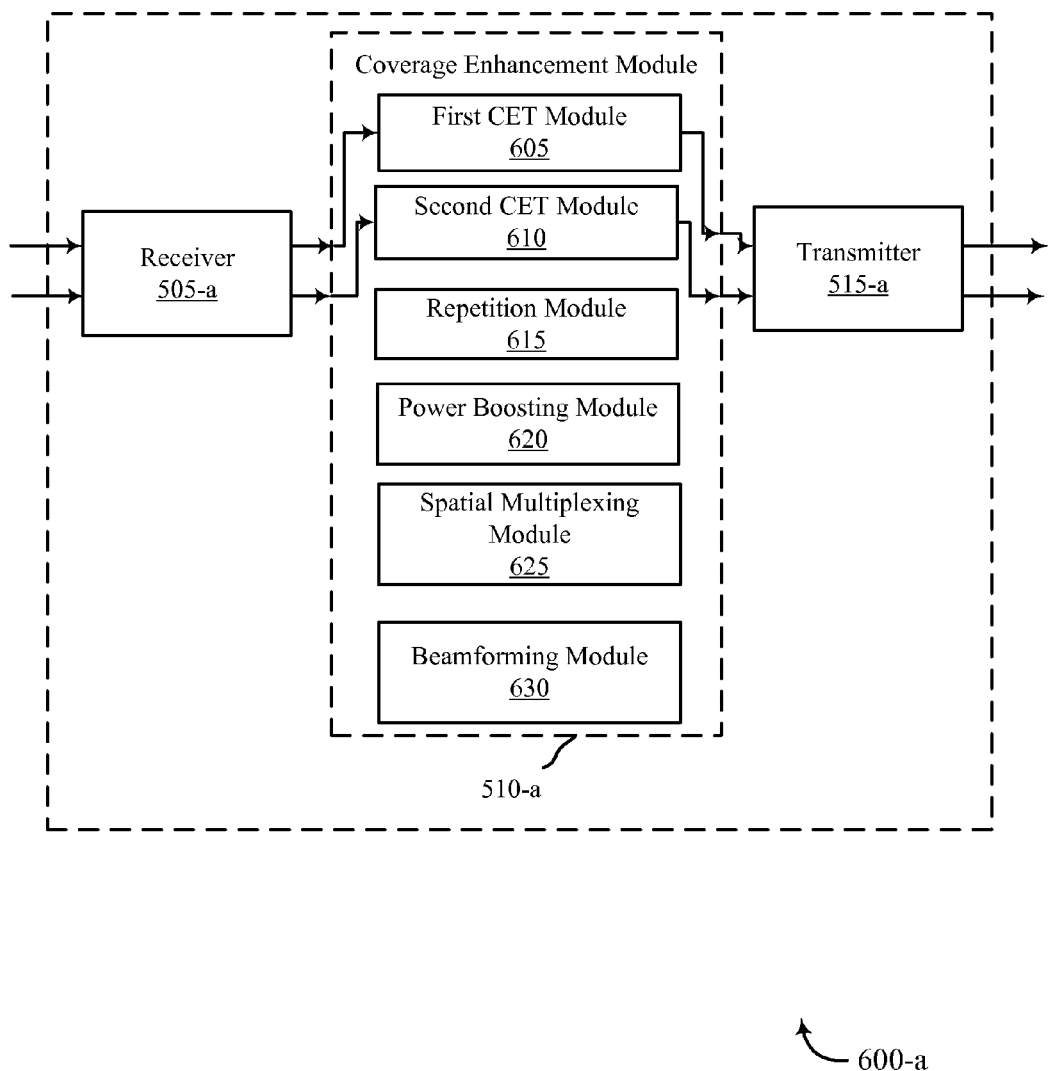
FIG. 6A shows a block diagram of an example device configured for coverage enhancement in accordance with various embodiments of the disclosure.

Turning next to FIG. 6A, a block diagram shows device 600-a for coverage enhancement in a wireless communication system in accordance with various embodiments. The device 600-a may be an example of one or more aspects of an eNB 105 described with reference to FIGS. 1 and 2. It may also be an example of a device 500 described with reference to FIG. 5. The device 600 may include a receiver 505-a, a coverage enhancement module 510-a, and/or a transmitter 515-a, which may be examples of the corresponding components of device 500. The device 600 may also include a processor (not shown). Each of these components may be in communication with each other. The coverage enhancement module 510-a may include a first coverage enhancement technique (CET) module 605, a second CET module 610, a repetition module 615, a power boosting module 620, a spatial multiplexing module 625, and a beamforming module 630.

The first CET module 605 may be means for selecting a first coverage enhancement technique for a first channel from a set of coverage enhancement techniques including at least one of repetition over different subframes or power boosting. In some cases, the first channel includes a broadcast or a groupcast channel and the first coverage enhancement technique includes repetition over different subframes. In some cases, the first channel comprises PDCCH and the second coverage enhancement technique comprises the repetition within the subframe.

The second CET module 610 may be means for selecting a second coverage enhancement technique, different from the first coverage enhancement technique, for a second channel from the set of coverage enhancement techniques. In some cases, the second channel comprises a unicast channel and the second coverage enhancement technique comprises precoding for spatial multiplexing. In some cases, the second channel comprises a PDSCH. In some cases, the second coverage enhancement technique comprises beamforming.

The repetition module 615 may be means for determining and/or implementing coverage enhancement techniques comprising repetition. The repetition module 615 may implement techniques selected by the first CET module 605 and the second CET module 610. These techniques may be implemented in coordination with the transmitter 515-a and other components of device 600. The repetition module 615 may determine repetition techniques available in a set of coverage enhancement techniques, including intra-subframe repetition and inter-subframe repetition, or a combination of intra-subframe and inter-subframe repetition.

The power boosting module 620 may be means for determining and/or implementing coverage enhancement techniques involving power boosting. The power boosting module 620 may implement techniques selected by the first CET module 605 and the second CET module 610. These techniques may be implemented in coordination with the transmitter 515-a and other components of device 600. The power boosting module 620 may determine power boosting techniques available in a set of coverage enhancement techniques. In one embodiment, the power boosting module 620 may determine a power level for transmission based at least in part on a maximum power level, the reliability of previous transmissions, and/or coordination with other coverage enhancement techniques.

The spatial multiplexing module 625 may be means for determining and/or implementing coverage enhancement techniques comprising spatial multiplexing. The spatial multiplexing module 625 may implement techniques selected by the first CET module 605 and the second CET module 610. These techniques may be implemented in coordination with the transmitter 515-a and other components of device 600. The spatial multiplexing module 625 may determine spatial multiplexing techniques available in a set of coverage enhancement techniques. If the set of coverage enhancement techniques includes precoding for spatial multiplexing, the spatial multiplexing module 625 may be the means for precoding to support multi-layer transmission. In some cases, the spatial multiplexing module 625 may operate in coordination with a transmitter comprising multiple transmit antennas.

The beamforming module 630 may be means for determining and/or implementing coverage enhancement techniques comprising beamforming. The beamforming module 630 may implement techniques selected by the first CET module 605 and the second CET module 610. These techniques may be implemented in coordination with the transmitter 515-a and other components of device 600. If the set of coverage enhancement techniques includes precoding for beamforming, the beamforming module 630 may be the means for precoding to support directional transmissions. In some cases, the beamforming module 630 may operate in coordination with a transmitter comprising multiple transmit antennas.

Figure 6B:
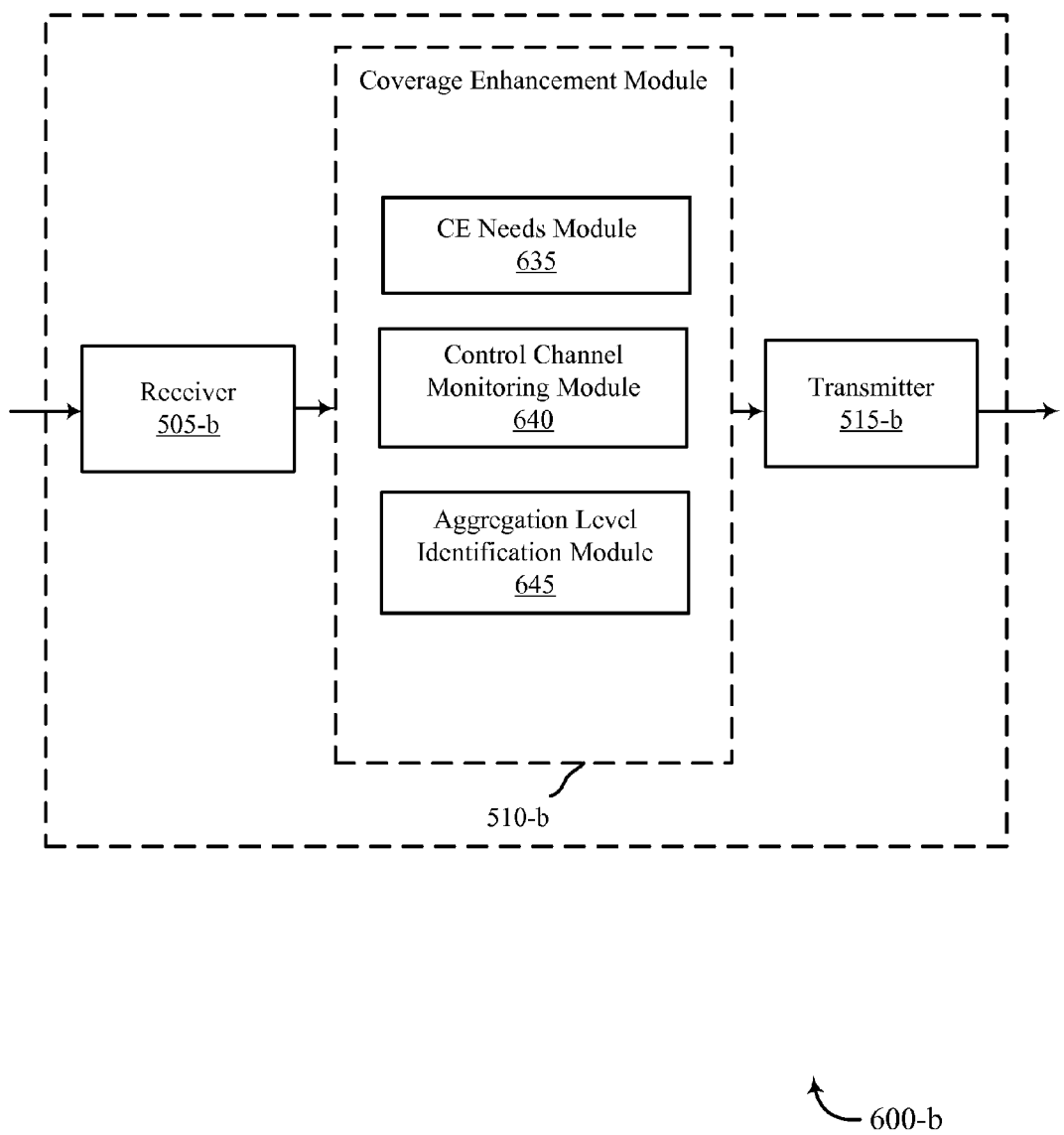
FIG. 6B shows a block diagram of an example device configured for coverage enhancement in accordance with various embodiments of the disclosure.

FIG. 6B, shows a block diagram shows device 600-b for coverage enhancement in a wireless communication system in accordance with various embodiments. The device 600-b may be an example of one or more aspects of a UE 115 described with reference to FIGS. 1 and 2. It may also be an example of a device 500 described with reference to FIG. 5. The device 600-b may include a receiver 505-b, a coverage enhancement module 510-b, and/or a transmitter 515-b, which may be examples of the corresponding components of device 500. The device 600-b may also include a processor (not shown). Each of these components may be in communication with each other. The coverage enhancement module 510-b may include a coverage enhancement needs module 635, a control channel monitoring module 640, and an aggregation level identification module 645.

The coverage enhancement needs module 635 may be a means for determining a coverage enhancement need for the device 600-b. The coverage enhancement needs module 635 may, for example, determine that the device 600-b does not need coverage enhancements. Or it may, for example, determine that the device 600-b has a 5 dB or a 20 dB, or greater, coverage enhancement need. In some cases, a determined coverage enhancement need may be different than a prior coverage enhancement need of the device 600-b.

The control channel monitoring module 640 may be a means for monitoring control channel transmissions from a base station, for example. The control channel monitoring module 640 may, in conjunction with the receiver 505-b, receive and monitor such transmissions, which may include PDCCH or EPDDCH, or both. The control channel monitoring module 640 may monitor a control channel based on a coverage enhancement need of the device 600-b, which may be determined by the coverage enhancement needs module 635.

In some examples, determining a coverage enhancement need may include identifying an aggregation level, as described above with reference to FIGS. 4A and 4B. The aggregation level identification module 645 may be a means for identifying an aggregation level, and the control channel monitoring module 640 may monitor a control channel based on the identified aggregation level.

Figure 7:
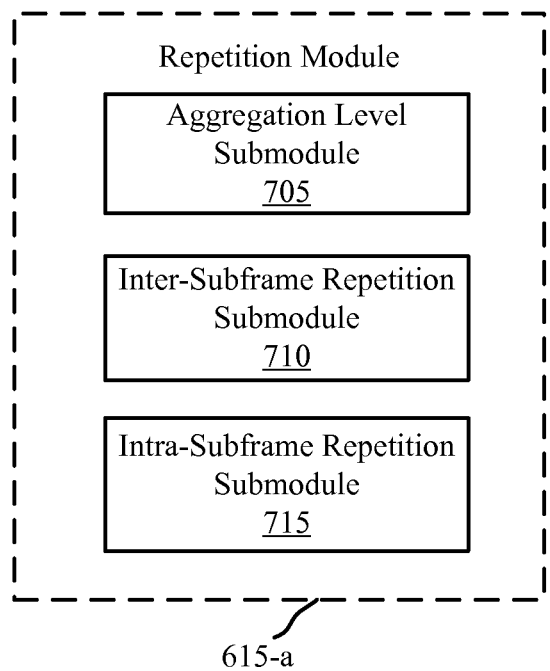
FIG. 7 shows a block diagram of an example device configured for coverage enhancement in accordance with various embodiments of the disclosure.

Turning next to FIG. 7, a block diagram shows device 700 for determining and/or implementing repetition techniques in accordance with various embodiments. The device 700, which may be a repetition module 615-a, and which may be an example of one or more aspects of the repetition module 615 described with reference to FIG. 6. The device 700 may include an aggregation level submodule 705, an inter-subframe repetition submodule 710, and an intra-subframe repetition submodule 715.

The aggregation level submodule 705 may be means for determining an aggregation level for transmission of control information. The maximum aggregation level may depend on a downlink system bandwidth. In some cases, repetition techniques, including repetition within a subframe, may include monitoring a maximum aggregation level larger than a nominal level without coverage enhancement. In one example, repetition within a subframe involves monitoring a maximum aggregation level equal to or larger than 16.

The inter-subframe repetition submodule 710 may be means for determining and/or implementing coverage enhancement techniques comprising repetition over different subframes. The inter-subframe repetition submodule 710 may implement techniques selected by a first CET module 605 and a second CET module 610. These techniques may be implemented in coordination with a transmitter 515-a. The inter-subframe repetition submodule 710 may determine repetition techniques available in a set of coverage enhancement techniques.

The intra-subframe repetition submodule 715 may be means for determining and/or implementing coverage enhancement techniques comprising repetition within a subframe. The intra-subframe repetition submodule 715 may implement techniques selected by the first CET module 605 and a second CET module 610. These techniques may be implemented in coordination with a transmitter 515-a. The intra-subframe repetition submodule 715 may determine repetition techniques available in a set of coverage enhancement techniques. It may operate in coordination with the inter-subframe repetition submodule 710 to implement techniques including repetition both within a subframe and across different subframes.

Figure 8A:
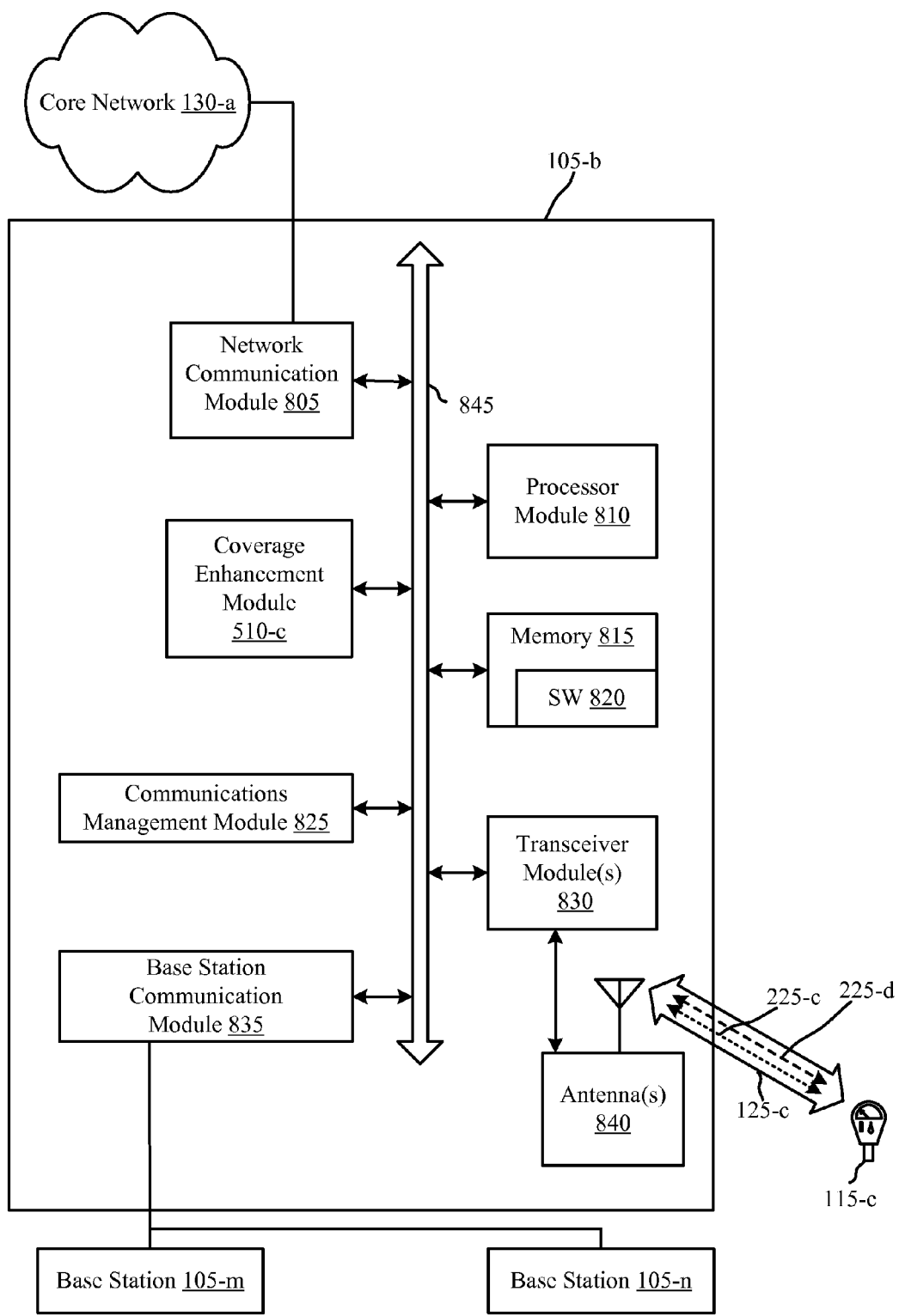
FIG. 8A shows a block diagram of an example system configured for coverage enhancement in accordance with various embodiments of the disclosure.

Turning next to FIG. 8A, a block diagram shows a communications system 800-a that may be configured for selecting coverage enhancement techniques in accordance with various embodiments. This system 800-a may be an example of aspects of the systems 100 or 200 of FIG. 1 and FIG. 2. System 800-a may also incorporate the components of devices 500, 600-a, 600-b, and 700 of FIGS. 5-7. The system 800-a includes an eNB 105-b configured for communication with UE 115-c over a wireless transmission link 125-c composed of at least channel 225-c and channel 225-d. The eNB 105-b may be capable of receiving transmission links 125 from other base stations (not shown).

In some cases, the eNB 105-b may have one or more wired backhaul links. The eNB 105-b may have a wired backhaul link (e.g., S1 interface, etc.) to the core network 130-a. The eNB 105-b may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, eNB 105-*b* may communicate with other base stations such as 105-*m* and/or 105-*n* utilizing base station communication module 835. In some embodiments, base station communication module 835 may provide an X2 interface within an LTE/LTE-A wireless communication network technology to provide communication between some of the base stations 105. In some embodiments, eNB 105-*b* may communicate with other base stations through core network 130-*a*. In some cases, eNB 105-*b* may communicate with the core network 130-*a* through network communications module 805.

The components for eNB 105-*b* may be configured to implement aspects discussed above with respect to eNB 105 of FIG. 1 and FIG. 2 and/or devices 500, 600-*a*, and 700 of FIGS. 5-7, and may not be repeated here for the sake of brevity. For example, the eNB 105-*b* may be configured to select different coverage enhancement techniques for different transmission channels. The coverage enhancement module 510-*c* may select a first coverage enhancement technique for a first channel and a second coverage enhancement technique for a second channel.

The eNB 105-*b* may include, a processor module 810, memory 815 (including software (SW) 820), transceiver modules 830, and antenna(s) 840, which each may be in communication, directly or indirectly, with each other (e.g., over bus system 845). The transceiver modules 830 may be configured to communicate bi-directionally, via the antenna(s) 840, with the UEs 115, which may be multi-mode devices. The transceiver module 830 (and/or other components of the eNB 105-*b*) may also be configured to communicate bi-directionally, via the antennas 840, with one or more other base stations (not shown). The transceiver module 830 may include a modem configured to modulate packets and provide the modulated packets to the antennas 840 for transmission, and to demodulate packets received from the antennas 840. The eNB 105-*b* may include multiple transceiver modules 830, each with one or more associated antennas 840. The transceiver module may be an example of a combined receiver 505 and transmitter 515 of FIG. 5.

The memory 815 may include random access memory (RAM) and read-only memory (ROM). The memory 815 may also store computer-readable, computer-executable software code 820 containing instructions that are configured to, when executed, cause the processor module 810 to perform various functions described herein (e.g., selecting coverage enhancement techniques, call processing, database management, message routing, etc.). Alternatively, the software 820 may not be directly executable by the processor module 810 but be configured to cause the computer, e.g., when compiled and executed, to perform functions described herein.

The processor module 810 may include an intelligent hardware device, e.g., a central processing unit (CPU), a microcontroller, an application-specific integrated circuit (ASIC), etc. The processor module 810 may include various special purpose processors such as encoders, queue processing modules, base band processors, radio head controllers, digital signal processors (DSPs), and the like.

According to the architecture of FIG. 8A, the eNB 105-*b* may further include a communications management module 825. The communications management module 825 may manage communications with other base stations 105. The communications management module may include a controller and/or scheduler for controlling communications with UEs 115 in cooperation with other base stations 105. For example, the communications management module 825 may perform scheduling for transmissions to UEs 115 and/or various interference mitigation techniques such as beamforming and/or joint transmission.

The eNB 105-*b* may include a coverage enhancement module 510-*c*, which may be configured substantially the same as coverage enhancement modules 510 of FIGS. 5 and 6. In some embodiments, the coverage enhancement module 510-*c* is a component of the eNB 105-*b* in communication with some or all of the other components of the eNB 105-*b* via a bus 845. Alternatively, functionality of the coverage enhancement module 510-*c* may be implemented as a component of the transceiver module 830, as a computer program product, as one or more controller elements of the processor module 810, and/or as an element of the communications management module 825.

Figure 8B:
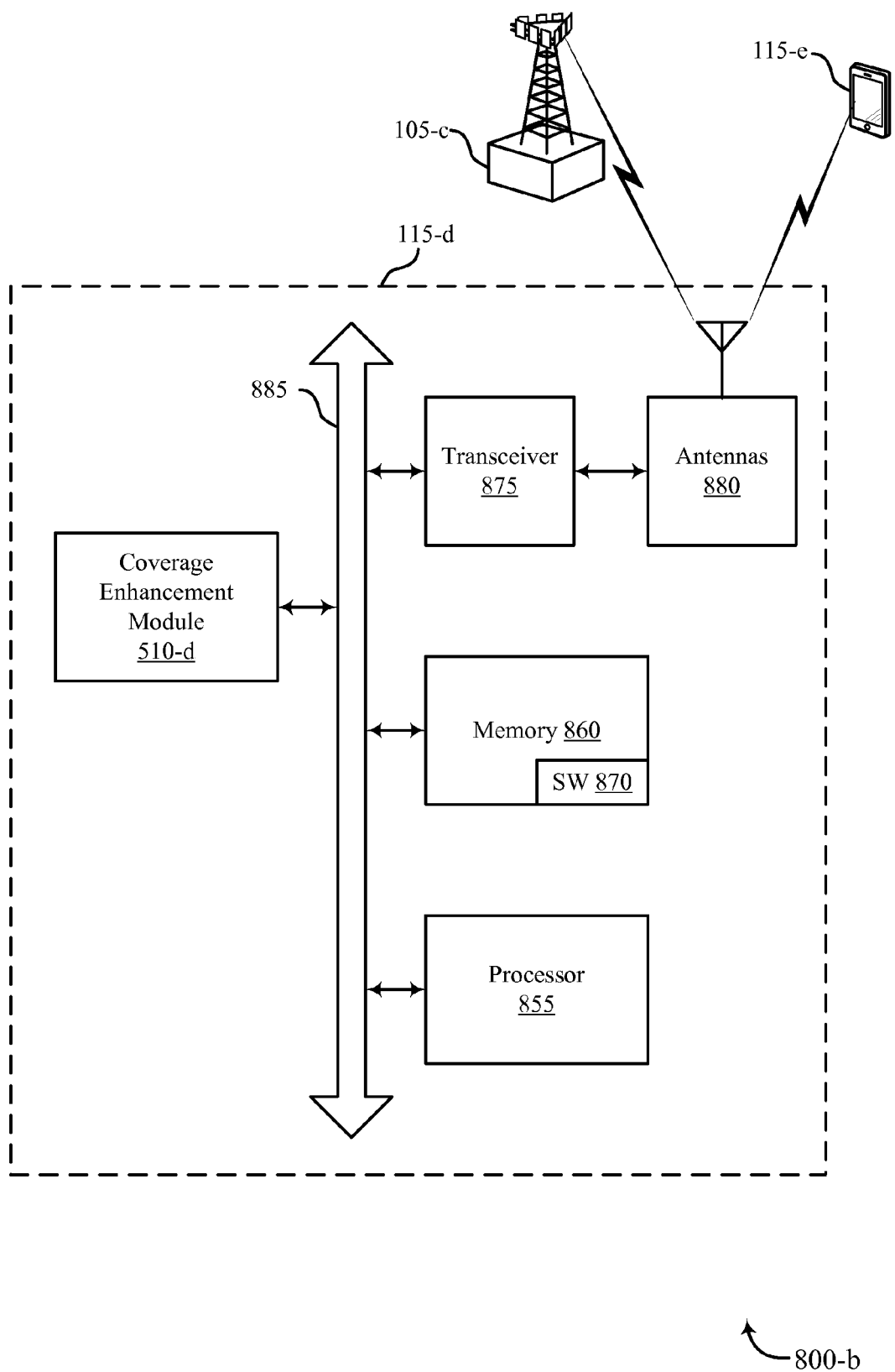
FIG. 8B shows a block diagram of an example system configured for coverage enhancement in accordance with various embodiments of the disclosure.

FIG. 8B shows a block diagram of a communications system 800-*b* that may be configured for utilizing coverage enhancement techniques in accordance with various embodiments. System 800-*b* may include UE 115-*d*, which may be an example of a UE 115 described above with reference to FIGS. 1 and 2 or devices 500 or 600-*b* of FIGS. 5 and 6B, respectively. UE 115-*d* may include a coverage enhancement module 510-*d*, which may be an example of a coverage enhancement module 510 described with reference to FIGS. 5 and 6B. UE 115-*d* may be an MTC device; but the UE 115-*d* may include components for bi-directional voice and data communications including components for transmitting communications and components for receiving communications. For example, UE 115-*d* may communicate bi-directionally with UE 115-*e* or base station 105-*c*.

UE 115-*d* may also include a processor module 855, and memory 860 (including software (SW) 870), a transceiver module 875, and one or more antennas 880, each of which may communicate, directly or indirectly, with each other (e.g., via buses 885). The transceiver module 875 may communicate bi-directionally, via the antennas 880 or wired or wireless links, with one or more networks, as described above. For example, the transceiver module 875 may communicate bi-directionally with a base station 105 or another UE 115. The transceiver module 885 may include a modem to modulate packets and provide the modulated packets to the antennas 880 for transmission, and to demodulate packets received from the antennas 880. While UE 115-*d* may include a single antenna 880, UE 115-*d* may also have multiple antennas 880 capable of concurrently transmitting or receiving multiple wireless transmissions.

The memory 860 may include random access memory (RAM) and read only memory (ROM). The memory 860 may store computer-readable, computer-executable software/firmware code 870, including instructions that, when executed, cause the processor module 885 to perform various functions described herein (e.g., determine a coverage enhancement need, monitor a control channel based on the coverage enhancement need, and the like). Alternatively, the software/firmware code 870 may not be directly executable by the processor module 855 but cause a computer (e.g., when compiled and executed) to perform functions described herein. The processor module 885 may include an intelligent hardware device, (e.g., a central processing unit (CPU), a microcontroller, an ASIC, etc.)

Figure 9:
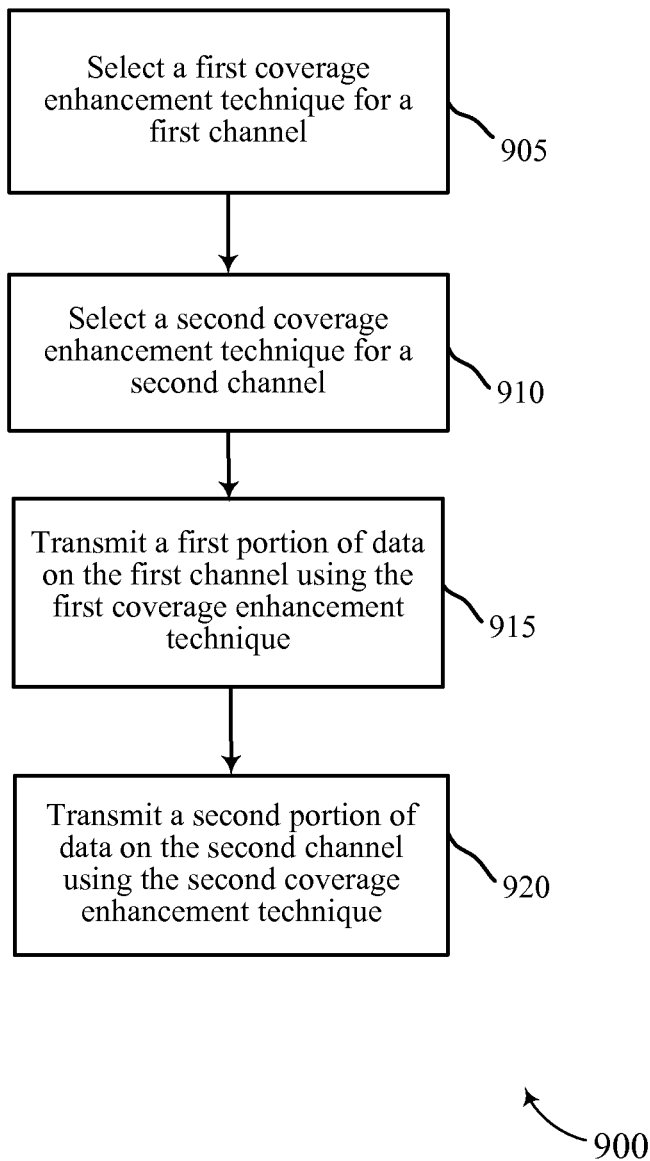
FIG. 9 is a flowchart of a method of coverage enhancement according to various embodiments of the disclosure.

Turning next to FIG. 9, a flowchart shows a method 900 of coverage enhancement in a wireless communication system in accordance with various embodiments. The method may be accomplished by various aspects of devices 500, 600-*a*, 700, and/or 800-*a* described with reference to FIGS. 5, 6A, 7, and 8A, which may be part of a system 100 or subsystem 200 with reference to FIGS. 1 and 2. The system in which the method 900 is performed may include a structure similar to that depicted in structure 300 and hierarchy 400 with reference to FIGS. 3 and 4.

At block 905, the first CET module 605 may select a first coverage enhancement technique for a first channel from a set of coverage enhancement techniques. The set of coverage enhancement techniques may include at least one of repetition over different subframes or power boosting. In some embodiment, the set of coverage enhancement techniques may include precoding for spatial multiplexing.

In some embodiment, the set of coverage enhancement techniques comprises a repetition within a subframe. The repetition within a subframe may involve use of a maximum aggregation level larger than a nominal level without coverage enhancement. For example, the repetition within a subframe may comprise use of a maximum aggregation level equal to or larger than 16. The maximum aggregation level may depend on a downlink system bandwidth. For example, it may depend on a number of subcarriers available for transmission.

In some cases, the first channel comprises a broadcast or a groupcast channel and the first coverage enhancement technique comprises repetition over different subframes. In some cases, the first channel comprises a PDCCH. In some cases, the first channel comprises an enhanced EPDCCH. The number of PRBs configured for EPDCCH may be larger than 8. In some cases, the first coverage enhancement technique comprises repetition within a subframe.

At block 910, the second CET module 610 may select a second coverage enhancement technique for a second channel from the set of coverage enhancement techniques. The second coverage enhancement technique may be different from the first coverage enhancement technique. In some cases, the second channel comprises a unicast channel and the second coverage enhancement technique comprises precoding for spatial multiplexing. In some cases, the second channel comprises a PDSCH. In some cases, the second coverage enhancement technique comprises the repetition within the subframe.

At block 915, the transmitter 515 may transmit a first portion of data on the first channel using the first coverage enhancement technique. At block 920, the transmitter 515 may transmit a second portion of data on the second channel using the second coverage enhancement technique.

Figure 10:
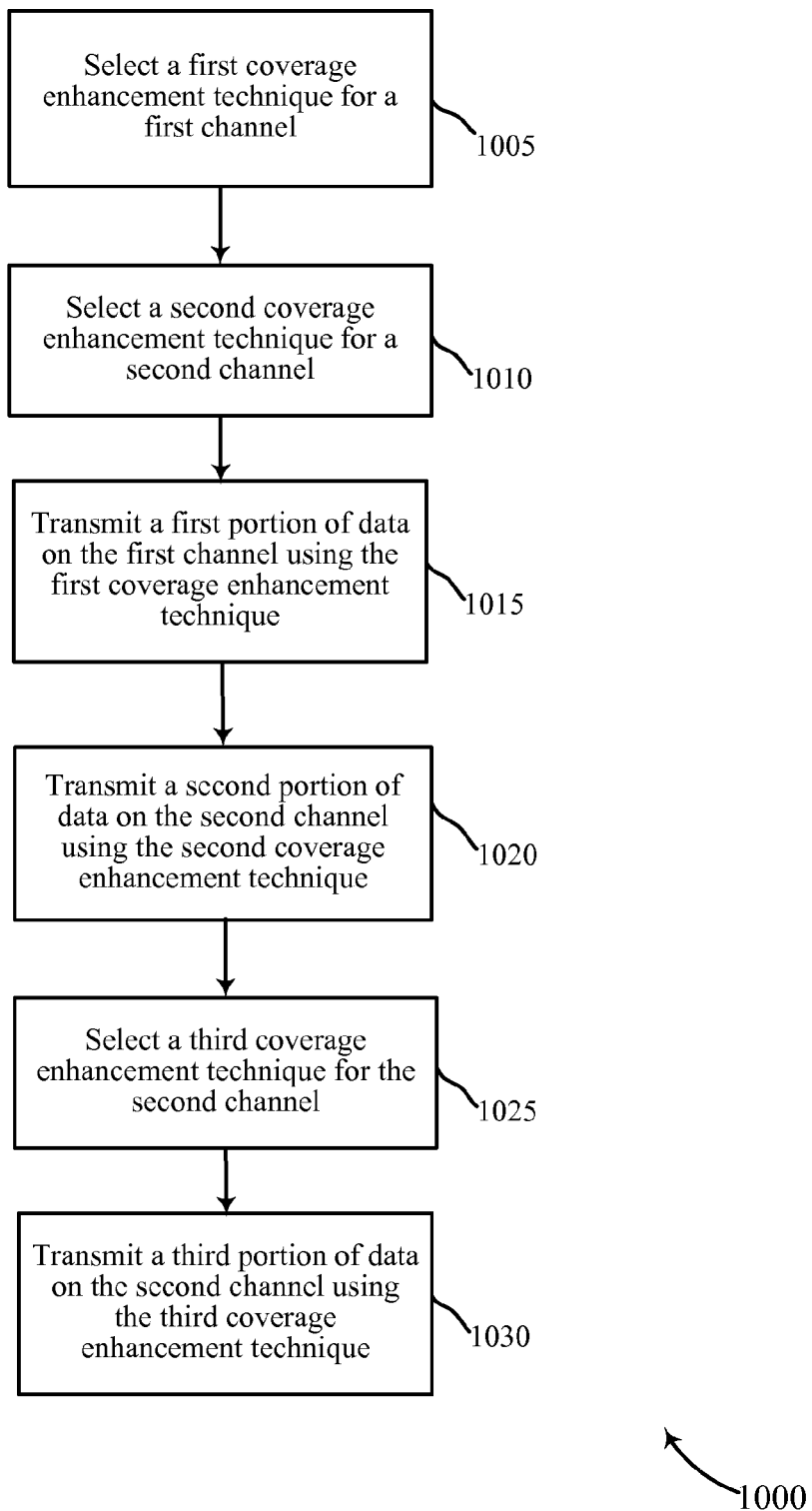
FIG. 10 is a flowchart of a method of coverage enhancement according to various embodiments of the disclosure.

Turning next to FIG. 10, a flowchart shows a method 1000 of coverage enhancement in a wireless communication system in accordance with various embodiments. The method may be accomplished by various aspects of devices 500, 600-a, 700, and/or 800-a with reference to FIGS. 5, 6A, 7, and 8A, which may be part of a system 100 or subsystem 200 with reference to FIGS. 1 and 2. The system in which the method 1000 is performed may include a structure similar to that depicted in structure 300 and hierarchies 400 with reference to FIGS. 3 and 4. The method 1000 may be an example of method 900 described with reference to FIG. 9.

At block 1005, the first CET module 605 may select a first coverage enhancement technique for a first channel from a set of coverage enhancement techniques. At block 1010, the second CET module 610 may select a second coverage enhancement technique for a second channel from the set of coverage enhancement techniques. At block 1015, the transmitter 515 may transmit a first portion of data on the first channel using the first coverage enhancement technique. At block 1020, the transmitter 515 may transmit a second portion of data on the second channel using the second coverage enhancement technique.

At block 1025, the second CET module 610 may select a third coverage enhancement technique for the second channel from the set of coverage enhancement techniques. In some cases, the first coverage enhancement technique comprises a first number of repetitions over a first plurality of subframes, the third coverage enhancement technique comprises a second number of repetitions over a second plurality of subframes, and the second number of repetitions is strictly less than the first number of repetitions. At block 1030, the transmitter 515 may transmit a third portion of data on the second channel using the third coverage enhancement technique.

Figure 11:
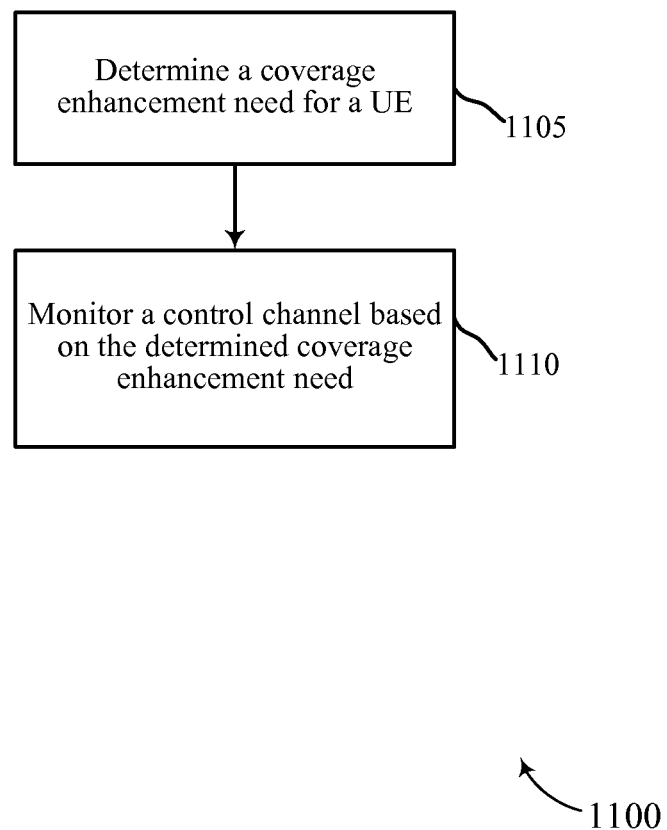
FIG. 11 is a flowchart of a method of coverage enhancement according to various embodiments of the disclosure.

Turning next to FIG. 11, a flowchart shows a method 1100 of coverage enhancement in a wireless communication system in accordance with various embodiments. The method may be accomplished by various aspects of devices 500, 600-b, and/or 800-b described with reference to FIGS. 5, 6B, and 8B, which may be part of a wireless communications system 100 or subsystem 200 with reference to FIGS. 1 and 2. The wireless communications system in which the method 1100 is performed may include a structure similar to that depicted in structure 300 and hierarchy 400 with reference to FIGS. 3 and 4.

At block 1105, the coverage enhancement module 510 may determine transmission coverage enhancement need for a UE. The coverage enhancement need may be zero. That is, in some examples, no coverage enhancements may be needed. In other cases, the coverage enhancement need may be a specific power level over a power level of a signal received without coverage enhancement (e.g., 3 dB, 5 dB, 20 dB, 30 dB, or the like). In some examples, determining a coverage enhancement need may include identifying an aggregation level.

At block 1110, the coverage enhancement module 510 may monitor a control channel based on the determined coverage enhancement need. This may include monitoring an identified aggregation level. The control channel may include a PDCCH or an EPDCCH. In some examples, determining the coverage enhancement need may include determining a size of bundled transmission for a control channel. Or determining a coverage enhancement need may include determining that no coverage enhancement is needed for the control channel transmission. In some examples, determining the coverage enhancement need may include determining that a control channel transmission with coverage enhancement is needed. The control channel transmission with coverage enhancement may include a control channel transmission with a aggregation level than used for a prior coverage enhancement.

Those skilled in the art will recognize that the methods 900, 1000, 1100 are example implementations of the tools and techniques described herein. The methods may be performed with more or fewer steps; and they may be performed in an order other than indicated.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the terms "embodiment," "example," or "exemplary" indicate an example or instance and do not imply or require any preference for the noted example. Thus, the disclosure is not to be limited to the examples and designs described herein but is to be accorded the widest scope consistent with the principles and novel features disclosed herein.

What is claimed is:

1. A method of coverage enhancement in a wireless communication system, comprising:
   selecting a first coverage enhancement technique for a first channel from a set of coverage enhancement techniques including at least one of repetition over different subframes or power boosting;
   selecting a second coverage enhancement technique, different from the first coverage enhancement technique, for a second channel from the set of coverage enhancement techniques, wherein the second channel is different from the first channel;
   transmitting a first portion of data to a user equipment (UE) on the first channel using the first coverage enhancement technique; and
   transmitting a second portion of data to the UE on the second channel using the second coverage enhancement technique.

2. The method of claim 1, wherein the set of coverage enhancement techniques further comprises precoding for spatial multiplexing.

3. The method of claim 1, wherein the first channel comprises a broadcast or a groupcast channel and the first coverage enhancement technique comprises repetition over different subframes.

4. The method of claim 1, wherein the second channel comprises a unicast channel and the second coverage enhancement technique comprises precoding for spatial multiplexing.

5. The method of claim 4, wherein the second channel comprises a physical downlink shared channel (PDSCH).

6. The method of claim 1, wherein the set of coverage enhancement techniques further comprises a repetition within a subframe.

7. The method of claim 6, wherein the first channel comprises at least one of a physical downlink control channel (PDCCH) or an enhanced PDCCH (EPDCCH) and the second coverage enhancement technique comprises the repetition within the subframe.

8. The method of claim 1, further comprising:
   selecting a third coverage enhancement technique for the second channel from the set of coverage enhancement techniques; and
   transmitting a third portion of data on the second channel using the third coverage enhancement technique.

9. The method of claim 8, wherein the first coverage enhancement technique comprises a first number of repetitions over a first plurality of subframes;
   the third coverage enhancement technique comprises a second number of repetitions over a second plurality of subframes; and the second number of repetitions is strictly less than the first number of repetitions.

10. A method of wireless communication, comprising:
determining a coverage enhancement need for a user equipment (UE), wherein determining the coverage enhancement need comprises identifying an aggregation level; and
monitoring a control channel based at least in part on the determined coverage enhancement need, wherein monitoring the control channel comprises monitoring the identified aggregation level.

11. The method of claim 10, wherein identifying the aggregation level comprises identifying a different aggregation level than used for a prior coverage enhancement.

12. The method of claim 10, wherein the control channel comprises at least one of a physical downlink control channel (PDCCH) or an enhanced PDCCH (EPDCCH).

13. The method of claim 10, wherein determining the coverage enhancement need comprises determining a size of bundled transmission for the control channel.

14. The method of claim 10, wherein determining the coverage enhancement need comprises determining that no coverage enhancement is needed for the control channel.

15. An apparatus for coverage enhancement in a wireless communication system, comprising:
a processor;
memory in electronic communication with the processor; and
instructions stored in the memory, the instructions being executable by the processor to cause the apparatus to:
select a first coverage enhancement technique for a first channel from a set of coverage enhancement techniques including at least one of repetition over different subframes or power boosting;
select a second coverage enhancement technique, different from the first coverage enhancement technique, for a second channel from the set of coverage enhancement techniques, wherein the second channel is different from the first channel;
transmit a first portion of data to a user equipment (UE) on the first channel using the first coverage enhancement technique; and
transmit a second portion of data to the UE on the second channel using the second coverage enhancement technique.

16. The apparatus of claim 15, wherein the set of coverage enhancement techniques further comprises precoding for spatial multiplexing.

17. The apparatus of claim 15, wherein the first channel comprises a broadcast or a groupcast channel and the first coverage enhancement technique comprises repetition over different subframes.

18. The apparatus of claim 15, wherein the second channel comprises a unicast channel and the second coverage enhancement technique comprises precoding for spatial multiplexing.

19. The apparatus of claim 18, wherein the second channel comprises a physical downlink shared channel (PDSCH).

20. The apparatus of claim 15, wherein the set of coverage enhancement techniques further comprises a repetition within a subframe.

21. The apparatus of claim 20, wherein the first channel comprises at least one of a physical downlink control channel (PDCCH) or an enhanced PDCCH (EPDCCH) and the second coverage enhancement technique comprises the repetition within the subframe.

22. The apparatus of claim 15, wherein the instructions are further executable to:
select a third coverage enhancement technique for the second channel from the set of coverage enhancement techniques; and
transmit a third portion of data on the second channel using the third coverage enhancement technique.

23. The apparatus of claim 22, wherein the first coverage enhancement technique comprises a first number of repetitions over a first plurality of subframes;
the third coverage enhancement technique comprises a second number of repetitions over a second plurality of subframes; and
the second number of repetitions is strictly less than the first number of repetitions.

24. An apparatus for wireless communication, comprising:
a processor;
memory in electronic communication with the processor; and
instructions stored in the memory, the instructions being executable by the processor to:
determine a coverage enhancement need for a user equipment (UE), wherein the instructions executable to determine the coverage enhancement need comprise instructions executable to identify an aggregation level; and
monitor a control channel based at least in part on the determined coverage enhancement need, wherein the instructions executable to monitor the control channel comprise instructions executable to monitor the identified aggregation level.

25. The apparatus of claim 24, wherein the instructions are executable to:
identify a different aggregation level than used for a prior coverage enhancement.

26. The apparatus of claim 24, wherein the control channel comprises at least one of a physical downlink control channel (PDCCH) or an enhanced PDCCH (EPDCCH).

27. The apparatus of claim 24, wherein the instructions are executable to:
determine a size of bundled transmission for the control channel.

28. The apparatus of claim 24, wherein the instructions are executable to:
determine that no coverage enhancement is needed for the control channel.

* * * * *